Patented Sept. 25, 1928.

1,685,195

UNITED STATES PATENT OFFICE.

WILHELM GENSECKE, OF BAD HOMBURG, GERMANY, ASSIGNOR TO AMERICAN LURGI CORPORATION, OF NEW YORK, N. Y., A CORPORATION OF NEW YORK.

PROCESS OF PURIFYING OILS AND FATS.

No Drawing. Application filed February 5, 1925, Serial No. 7,180, and in Italy February 15, 1924.

The use of soda (sodium carbonate) for the neutralization of free fatty acids in oils and fats in processes for the purification thereof is advantageous in that, for instance, unlike other neutralizing agents such as caustic soda, it does not, even when present in excess, hydrolize or decompose the oil or fat. Soda also has the advantage of being cheaper than caustic soda and other materials ordinarily used in the purification of oils and fats. Up to the present time, however, in spite of the advantages referred to, soda has been unsuitable for practical use for reasons appearing hereinafter.

In order to preserve the quality of the neutral oil or fat its treatment must be carried out at the lowest possible temperature. But it has been impossible heretofore to secure a complete neutralization of the fatty acids by means of soda at low temperatures, even by using the soda in considerable excess. Moreover, the soap formed by the neutralization of the free fatty acids due to the evolution of carbon dioxid collects partly at the top and partly at the bottom of the body of oil, as a result of which the separation of the oil from the soap is attended by a considerable loss of oil.

By working at higher temperatures it is possible to obtain a more extensive, although incomplete, reaction or neutralization, but this advantage is attended by the disadvantages that the neutral oil is injured by the high temperatures and the soap formed dissolves in and contaminates the oil. Furthermore, violent foaming occurs, especially in the treatment of oils and fats having a relatively high free acid content. This foaming impedes the process and in some instances causes heavy losses due to the overflowing of the charge from the reaction vessel.

By the present invention it is possible to obtain a complete neutralization of the fatty acids in oils and fats without the disadvantages above referred to.

In accordance with the present invention the neutralization is carried out under such conditions that water introduced into the reaction mixture with the soda and that formed in the reaction mixture by the neutralization is removed. A concentration of the alkali is thus effected during the neutralization process and the reaction mixture is maintained substantially dry. For example, the oil to be purified is placed in a vessel under a partial vacuum and a soda solution is slowly introduced substantially at the rate at which it reacts with the fatty acids in the oil. The vacuum and the temperature of the reaction mixture are so adjusted that the water content of the solution is evaporated and the water produced by the reaction is removed practically as soon as it is formed. The rate at which the soda solution is added is governed by the rate at which the water vapor is removed, the desired object being to effect a concentration of the alkali during the neutralization process.

The temperature of vaporization of water is a function of the absolute pressure. The temperature of vaporization of water containing dissolved substances is also a function of the absolute pressure but the vapor pressure of such solutions is lowered at all temperatures due to the presence of the dissolved substance. Also, the lowering in vapor pressure varies with the amount of dissolved substance. Since the temperature of vaporization of water varies with the vapor pressure, the temperature of vaporization of the soda solution used in the process varies with the concentration of the soda solution. The preferred temperature at which the process is carried out is determined in practice and depending upon the character of oil or fat lies between 20–50° C.

When the neutralization is carried out as described the soap formed is readily separable from the bulk of the oil by filtration. It contains a certain percentage of neutral oil, a part of which may be separated by pressing. The amount of oil which can be recovered in this manner depends upon the physical character of the soap, which in turn depends upon the kind of oil which is treated. Thus good yields of the neutral oil are obtainable without difficulty. When the temperature of the neutralization is kept low, for example in the neighborhood of 20–50° C., which is technically possible when operating under the pressure conditions described, the oil does not dissolve any soap. An oil is thus obtained which is free of soap. At higher temperatures the soap dissolves in the oil in increasing quantities. The performance of the process under the conditions described also causes the precipitation of other impurities such as coloring materials, mucous matter, dry-fatty acids and dissolved iron. Oils treated by the process of this invention are of a considerably clearer color after neutralization than before. The impurities are coagulated or precipitated along with the soap and are removed with the soap by filtration. The evolution of carbon dioxid during the reaction assists the process in that it promotes the evaporation and removal of water from the reaction mixture.

As is evident, the specific procedure described is capable of variation without departure from my invention. It is for instance possible to introduce the oil to be purified and the soda solution into the reaction vessel simultaneously. The concentration of the soda solution, the rate of introduction of the soda solution, the temperature and pressure are of course capable of considerable variation.

One way in which the process of this invention may be carried out is illustrated by the following specific example:

6350 kg. of arachis oil containing 7.25% of fatty acid were neutralized by adding a solution of 103 kg. of practically anhydrous soda in 300 kg. of water. This neutralization agent contains a small excess, amounting to about 10%, over the amount theoretically necessary. The temperature in the saponification vessel was about 35° C. at the start of the reaction. The vessel was then put under a partial vacuum and the alkali was allowed to flow in during the course of 3/4 of an hour. During this time the temperature was raised to about 50° C. by heating with a water jacket. Then heating was discontinued, whereupon the temperature fell and was about 36° C. at the end of the reaction. The absolute pressure in the vessel was at first kept at about 50 mm. of mercury and at the end was decreased to about 2 mm. of mercury. Then the neutralized oil was separated from the soap formed by filtration. It was found to contain only .03% of fatty acid.

I claim:—

1. In a process for the purification of oils and fats containing free fatty acids, the steps of slowly introducing a soda solution in amount sufficient to neutralize the free fatty acids into a body of the oil or fat to be purified, and continuously removing the water content of the reaction mixture by evaporation during the neutralization process in an amount at least equal to the amount of water introduced in the form of the soda solution plus the amount formed by reaction.

2. A process as defined in claim 1, in which the reaction is carried out under sub-atmospheric pressure.

In testimony whereof, I affix my signature.

WILHELM GENSECKE.